United States Patent [19]

Klein

[11] Patent Number: 5,344,856
[45] Date of Patent: Sep. 6, 1994

[54] WATER-EMULSIFIABLE EPOXY RESIN COMPOSITION

[75] Inventor: Dieter H. Klein, Rheinmuenster, Fed. Rep. of Germany

[73] Assignee: The Dow Chemical Company, Midland, Mich.

[21] Appl. No.: 63,253

[22] Filed: May 17, 1993

Related U.S. Application Data

[63] Continuation-in-part of Ser. No. 809,718, Dec. 17, 1991, abandoned.

[30] Foreign Application Priority Data

Dec. 17, 1990 [GB] United Kingdom ............... 9027291

[51] Int. Cl.$^5$ .......................... C08K 3/20; C08L 63/02
[52] U.S. Cl. ................................. 523/403; 427/386; 428/413; 523/404
[58] Field of Search ................ 523/415, 403, 404; 427/386; 428/413

[56] References Cited

U.S. PATENT DOCUMENTS

| | | |
|---|---|---|
| 3,650,996 | 3/1972 | Gueldenpfennig . |
| 3,720,648 | 3/1973 | Gueldenpfennig . |
| 4,107,112 | 8/1978 | Latta, Jr. et al. . |
| 4,128,515 | 12/1978 | Tobias et al. . |
| 4,230,552 | 10/1980 | Schimmel et al. . |
| 4,263,352 | 4/1981 | Kaltenbach et al. . |
| 4,289,826 | 9/1981 | Howell, Jr. . |
| 4,308,183 | 12/1981 | Williams . |
| 4,315,044 | 2/1982 | Elmore et al. . |
| 4,385,138 | 5/1983 | Sagane et al. . |
| 4,436,848 | 3/1984 | Haines et al. . |
| 4,478,985 | 10/1984 | Bekooij et al. . |
| 4,522,851 | 6/1985 | Rosthauser . |
| 4,602,053 | 7/1986 | Huybrechts et al. . |
| 4,608,304 | 8/1986 | Rosthauser . |
| 4,614,775 | 9/1986 | Bekooij et al. ................. 525/533 |
| 4,686,248 | 8/1987 | Bekooij et al. . |
| 4,859,721 | 8/1989 | Oberkobusch et al. . |
| 4,987,163 | 1/1991 | Becker et al. . |

FOREIGN PATENT DOCUMENTS

| | | |
|---|---|---|
| 884031 | 12/1961 | United Kingdom . |
| 1380108 | 1/1975 | United Kingdom . |
| 1533815 | 11/1978 | United Kingdom . |
| 2127829 | 4/1984 | United Kingdom ............... 523/415 |

OTHER PUBLICATIONS

Japan Patent Abstract vol. 12 No. 192, Jun. 8, 1988, describing Japan Patent 62/298437.
Chemical Abstract 82:126691 (1975) describing Japan Kokai 7494786.

Primary Examiner—Melvyn I. Marquis
Assistant Examiner—D. Aylward

[57] ABSTRACT

The invention is a water dispersible epoxy resin composition comprising:
(A) the reaction product of;
 (i) one or more polyepoxides;
 (ii) optionally, one or more poly(aromatic hydroxy) containing compounds,
 (iii) optionally, one or more chain terminators; and
 (iv) one or more nominally difunctional $C_{12-36}$ fatty acids or a dimer of an unsaturated, fatty acid, and
B) a sufficient amount of a surfactant to form a stable dispersion of the epoxy resin in water wherein the surfactant comprises an alkyl aryloxy poly(propyleneoxy) poly(ethyleneoxy) ethanol, a $C_{12-36}$ hydrocarbyloxy poly(propyleneoxy) poly(ethyleneoxy) ethanol or a $C_{12-36}$ hydrocarbylcarboxyloxy poly(propyleneoxy) poly(ethyleneoxy) ethanol. In another aspect the invention is a high solid aqueous emulsion of such epoxy resin reaction product and surfactant. In yet another aspect, the invention is a coating composition comprising an aqueous emulsion containing the hereinbefore describe epoxy resin coating composition, and a water-soluble dispersible, or emulsifiable curing agent or hardener for such epoxy resin composition.

16 Claims, No Drawings

WATER-EMULSIFIABLE EPOXY RESIN COMPOSITION

CROSS REFERENCE TO RELATED APPLICATION

This is a continuation in part of "WATER-EMULSIFIABLE EPOXY RESIN COMPOSITION", Ser. No. 07/809,718 filed Dec. 17, 1991, now abandoned.

The invention relates to a water-emulsifiable epoxy resin composition. In another aspect, the invention relates to a water-emulsion containing a water-emulsifiable epoxy resin composition. In yet another aspect, the invention relates to a water-based coating composition based on curable epoxy resin water emulsions.

Two-part epoxy resin based coating systems generally comprise a curable epoxy resin, and a curing agent for such an epoxy resin. An example of such a system is disclosed in Chemical Abstracts 82:126 691 (1975) describing Japan Kokai 74 94,786 (incorporated herein by reference) which discloses a varnish prepared from a bisphenol A epoxy resin (epoxy equivalent weight 186 to 188) 100 parts; anhydrous methyl-3,6-endo-methylene tetrahydroychthalic acid 150 parts; 2,4,6-tris (dimethylamino) phenol 10 parts; phenyl glycidyl ether 74 parts; and a p-nonylphenoxy poly(ethoxy) ethanol having 10 internal ethoxy units, 6.68 parts. It is further disclosed that a nonyl phenoxy poly(ethoxy) ethanol having 11 internal ethoxy units or a $C_{18}$ fatty acid initiated poly(ethoxy) ethanol having 6 external ethoxy units may also be used. Such systems are commonly dispersed or dissolved in a solvent to prepare coating compositions, for example paints, floor sealants, and the like. Most systems used commercially involve the dispersion or dissolution of such a two-part system in an organic solvent. Significant environmental concerns are created due to the use of such organic-based coating compositions, as the evaporation of the organic solvents create the potential for environmental pollution and for creating health hazard, particularly in those areas where a risk is created by the evaporation of solvents, for example as a floor sealer in enclosed space such as garages, multi-level, car parks, manufacturing plants etc. On the other hand cured epoxy resin based coatings provide hard and abrasion resistant coatings which are resistant to hydrocarbons and aqueous media.

Water-based resins systems consisting of a reactive binder, i.e. an epoxy resin, and a hardener emulsified in water have been developed. Howell U.S. Pat. No. 4,289,826 (relevant parts incorporated herein by reference) discloses aqueous compositions useful for forming a protective coating on metal surfaces, in particular, ferrous or tin surfaces. The compositions comprise (a) an epoxy resin having an average molecular weight of 900 to 2,900 and 2.7 to 11.6 hydroxy equivalent per mole; (b) an alkylated melamine-formaldehyde resin; (c) an acid catalyst to promote the reaction of the epoxy resin and the melamine-formaldehyde resin (d) and a block copolymer having an internal block comprising a poly (propylene oxide) chain and two external blocks comprising poly(ethylene oxide) chains and two terminal hydroxy moieties. The block copolymer must have a hydrophilic-lipophilic balance (HLB) in excess of 22 and a molecular weight 5000 to 14000 and be present in an amount of from 2 to 12 weight percent of the total epoxy resin and melamine-formaldehyde resin. The composition comprises the aforementioned components in aqueous solution at a total concentration of from 5 to 85 percent by weight. Such water-based resin systems for surface coating applications create significantly less environmental and health concerns. The advantages of such two-component water dispersible epoxy resin systems include reduced environmental pollution, less obtrusive solvent odour during application, reduced health and safety risks, reduced flammability, water clean-up of application equipment, excellent wettability to moist concrete and good adhesion and mechanical strength.

Epoxy resins are hydrophobic. To render them water-dispersible they must be made hydrophilic. Generally an epoxy resin has an HLB value of three or less. Usually the hydrophobic epoxy resin is dispersed in water with the use of a surfactant. Such surfactants may be added externally to the epoxy resin or may be incorporated via reaction through the backbone of the polymer, or by side chain modification of the resin. U.S. Pat. No. 4,315,044 (incorporated herein by reference) discloses an epoxy dispersion comprising an aqueous medium and a self-emulsifying resin which is the addition product of a liquid epoxy resin, a dihydric alcohol, such as bisphenol A, and a diglycidyl ether of a polyoxyalkylene glycol. These glycols are commercially available and are block copolymers of ethylene oxide and propylene oxide having a molecular weight of 5000 to 10,000, and contain about 50 to 90 weight percent ethylene oxide and about 10 to 50 weight percent propylene oxide. European Patent Application 202,765 discloses the utilization of a similar formulation and additionally requires the use of propylene glycol monomethyl ether as a cosolvent (incorporated herein by reference).

Known two-part water-based epoxy resin emulsion coating compositions have significant disadvantages. First, it is very difficult to develop a stable emulsion. Second, it is difficult to develop an emulsion which has high solids content and low viscosity and therefore good flowability, enabling easy application to the surface to be coated. Many of the known systems display poor coatings properties once dried and cured. In particular, such coatings do not readily coalesce when coated with a substrate resulting in coatings with poor flexibility and adhesion. Coalescence can be improved some by the addition of coalescent aids. Additionally such systems have a very limited hydrophilic hydrophobic balance such that there is little flexibility in formulation of coatings.

What is needed is an emulsifiable epoxy resin composition which forms a stable water-emulsion. What is needed are internally plasticized epoxy resins which form particles which coalesce readily into a continuous film to give good adhesion and corrosion resistance. What is further needed are stable water emulsions of curable epoxy resins. Further, what is needed, are two-part coating compositions of epoxy resins and hardeners therefor, which are stable and give good coating properties, i.e., adhesion, toughness, resiliency and flexibility. Further, such formulations with high solid levels are needed.

The invention herein provides solutions to some or all of such problems. In particular the invention is a water-emulsifiable epoxy resin composition comprising:

A) the reaction product of
  i) one or more polyepoxides,
  ii) optionally, one or more poly(aromatic hydroxy) containing compounds,
  iii) optionally, one or more chain terminators; and, iv) one or more nominally difunctional $C_{12-36}$ fatty acids, or dimers of unsaturated fatty acids; and B) a sufficient amount of a surfactant to form a stable emulsion of the epoxy resin in water wherein the surfactant comprises an alkyl aryloxy poly(propyleneoxy) poly(ethyleneoxy) ethanol, a $C_{12-36}$ hydrocarbyloxy poly(propyleneoxy) poly(ethyleneoxy) ethanol or a $C_{12-36}$ hydrocarbylcarbonyloxy poly(proplyleneoxy) poly(ethyleneoxy) ethanol, wherein the hydrocarboxy moiety is the residue of a $C_{12-36}$ fatty alcohol and the hydrocarbylcarbonyloxy is the residue of a $C_{12-36}$ fatty acid. Element A) is hereinafter referred to as Reaction Product A.

In another aspect the invention is a high solids aqueous emulsion of such epoxy resin reaction product and surfactant. In yet another aspect, the invention is a coating composition comprising an aqueous emulsion containing the hereinbefore described epoxy resin coating composition, and a water-soluble dispersible, or emulsifiable curing agent or hardener for such epoxy resin composition.

The water-emulsifiable epoxy resin composition of this invention allows the preparation of stable aqueous emulsions and two-part coating composition. Such coating compositions demonstrate good stability, wettability and viscosity characteristics. Further the coatings prepared for such coating compositions demonstrate good adhesion coalescence, flexibility, resiliency and toughness.

Emulsion as used herein is a stable mixture of the epoxy resin composition described hereinbefore held in suspension in water, wherein the continuous phase is water and the dispersed phase is the epoxy resin composition. Emulsifiable as used herein shall mean capable of forming a stable oil in water emulsion. Stable emulsion as used herein refers to an emulsion in which the epoxy resin composition does not settle to the bottom and form a solid cake at ambient temperature for a period of six months or after four weeks at 40° C.

Polyepoxide as used herein refers to a compound, or a mixture of compounds which contain, on average, more than one epoxy moiety per molecule. Also included are partially advanced epoxy resins i.e. the reaction of a polyepoxide and a polyhydroxy hydrocarbon compound, wherein the reaction product has an average of more than one unreacted epoxide unit per molecule. Polyepoxides (polyglycidyl ethers of a polyhydroxy hydrocarbon) are prepared by reacting an epihalohydrin with a polyhydroxy hydrocarbon or a halogenated polyhydroxy hydrocarbon. The preparation of such compounds is well known in the art. See Kirk-Othmer Encyclopedia of Chemical Technology 3rd Ed. Vol. 9 pp 267-289 (incorporated herein by reference).

The epihalohydrins correspond to formula 1

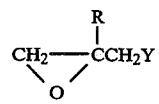

wherein

Y is a halogen, preferably chloro or bromo, and most preferably chloro;

and R is hydrogen or $C_{1-4}$ alkyl, and more preferably methyl.

Polyhydroxy hydrocarbon means herein a compound with a hydrocarbon backbone and, on average, more than one primary or secondary hydroxy moiety, preferably two or more. Halogenated polyhydroxy hydrocarbon means herein a polyhydroxy hydrocarbon which is substituted with one or more halogens. The hydroxyl moieties may be bound to aromatic aliphatic or cycloaliphatic moieties. Among preferred classes of polyhydroxy hydrocarbons and halogenated polyhydroxy hydrocarbons are the bisphenols; halogenated bisphenols; hydrogenated bisphenols; novolac resins, i.e. the reaction product of phenols and simple aldehydes, preferably formaldehyde; and polyalkylene glycols. The reaction product of phenol and an aldehyde, preferably formaldehyde, is a well-known product, as the process for its production. Such a product is commonly referred to as a novolac resin.

Preferred polyhydroxy compounds useful in this invention correspond to formula 2

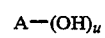

wherein

A is an aryl moiety; aryl moiety substituted with an alkyl or halo moiety; a polyaryl moiety wherein the aryl moieties are connected by direct bonds, alkylene, haloalkylene, cycloalkylene, carbonyl, sulfonyl, sulfinyl, oxygen, or sulfur, such poly aryl moieties being optionally substituted with one or more alkyl or halo moieties; or the oligomeric reaction product of an aldehyde and phenol; and u is a positive real number greater than about 1.

More preferred polyhydroxy hydrocarbons and halogenated polyhydroxy hydrocarbons include those corresponding to formulas 3 to 7:

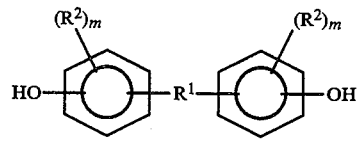

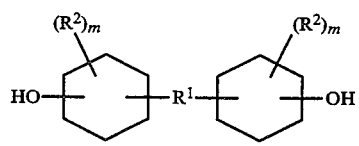

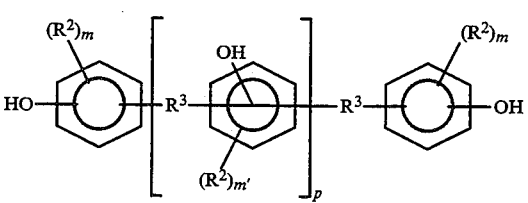

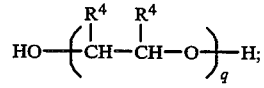

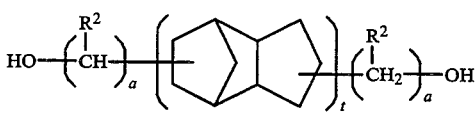

wherein $R^1$ is separately in each occurrence $C_{1-10}$ alkylene, $C_{1-10}$ haloalkylene, $C_{4-10}$ cycloalkylene, carbonyl, sulfonyl, sulfinyl, oxygen, sulfur, a direct bond or a moiety corresponding to formula 8

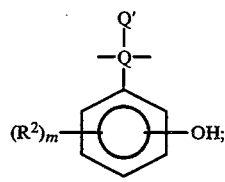

R² is separately in each occurrence $C_{1-3}$ alkyl or a halogen;

R³ is separately in each occurrence $C_{1-10}$ alkylene or $C_{5-50}$ cycloalkylene;

R⁴ is separately in each occurrence hydrogen, methyl, halomethyl, or ethyl, with the proviso that if one R⁴ on an ethylene unit is ethyl the other must be hydrogen;

Q is separately in each occurrence a tetra valent $C_{1-10}$ hydrocarbyl moiety;

Q' is separately in each occurrence hydrogen, cyano, or a $C_{1-14}$ alkyl group;

a is independently in each occurrence about 0 or about 1;

m is independently in each occurrence an integer of about 0 to about 4;

m' is separately in each occurrence an integer of from about 0 to about 3;

p is a positive real number of about 0 to about 10;

q is a positive real number of about 1 to about 80; and t is an average number from about 1 to about 6.

Even more preferable polyhydroxy hydrocarbons are those represented by formulas 3, 4 and 6.

R¹ is preferably $C_{1-3}$ alkylene, $C_{1-3}$ haloalkylene, carbonyl, sulfur, or a direct bond; is more preferably a direct bond, propylene, or fluorinated propylene (=C(CF₃)₂—); and most preferably propylene. R² is preferably methyl, bromo or chloro; and most preferably methyl or bromo. R³ is preferably $C_{1-3}$ alkylene or polycyclic moiety corresponding to formula 9

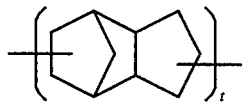

wherein t is an average number from about 1 to about 6, preferably from about 1 to about 3, most preferably about 1. Preferably, m' is an integer of from about 0 to about 2. Preferably, m is an integer of from about 0 to about 2. Preferably, p is a positive real number of from about 0 to about 8; and more preferably from about 0 to about 4. Preferably, q is a positive real number from about 2 to about 40, and more preferably from about 2 to about 20 and most preferably from about 5 to about 15. Preferably u, is from greater than about 1 to about 10, even more preferably from greater than about 1 to about 3, and most preferably from about 1.9 to about 2.1.

Among preferred polyhydroxy hydrocarbons are the dihydroxy phenols and the polyalkylene glycols. Preferable dihydroxy phenols include those which contain substituents that are non-reactive with the phenolic groups. Illustrative of such phenols are 2,2-bis(3,5-dibromo-4-hydroxyphenyl) propane; 2,2-bis(4-hydroxyphenyl) propane; 2,2-bis(3,5-dichloro-4-hydroxyphenyl) propane; bis (4-hydroxyphenyl) methane; 1,1-bis(4-hydroxyphenyl)-1-phenyl ethane; 1,1'-bis(2,6-dibromo-3,5-dimethyl-4 hydroxy phenyl) propane; bis (4-hydroxyphenyl) sulfone; bis (4-hydroxyphenyl) sulfide; resorcinol; hydroquinone; and the like. The preferred dihydroxy phenolic compounds are 2,2-bis(4-hydroxyphenyl) propane (bisphenol A), 2,2 bis(4 hydroxyphenyl) methane (bisphenol F) and 2,2-bis(4-hydroxy-3,5-dibromophenyl) propane. Cycloalkylene as used herein refers to monocyclic and polycyclic hydrocarbon moieties.

As used herein haloalkyl refers to a compound with a carbon chain and one or more of the hydrogens replaced with a halogen. Haloalkyl also means compounds wherein all of the hydrogen atoms have been replaced by halogen atoms. Alkylene as used herein refers to a divalent alkyl moiety.

The polyepoxides useful in the invention preferably correspond to formula 10.

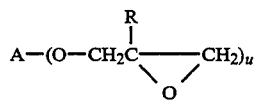

wherein A, R, and u are previously defined. Preferably the polyepoxides are chosen such that the Reaction Product (A) is not significantly crosslinked. Such highly crosslinked reaction products form gels and do not form good coatings. Some branching may be present as long as the reaction product (A) does not form a gel. Preferably, the average number of epoxide moieties per molecule (i.e. u in formula 10) is about 2.25 or less, more preferably from about 1.9 to about 2.1.

The polyepoxides more preferably correspond to one of formulas 11 to 15.

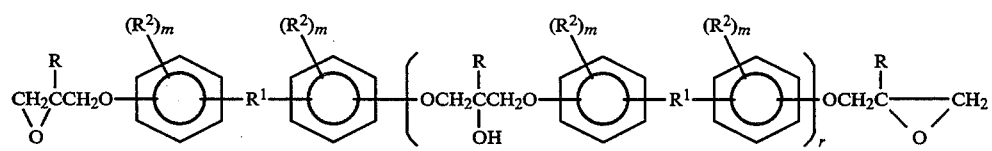

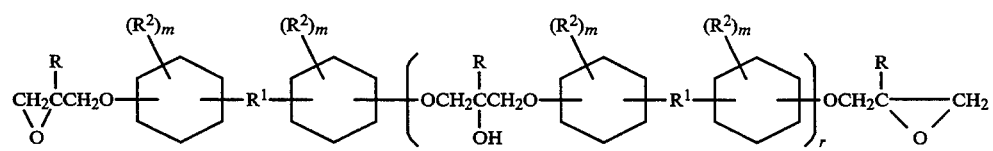

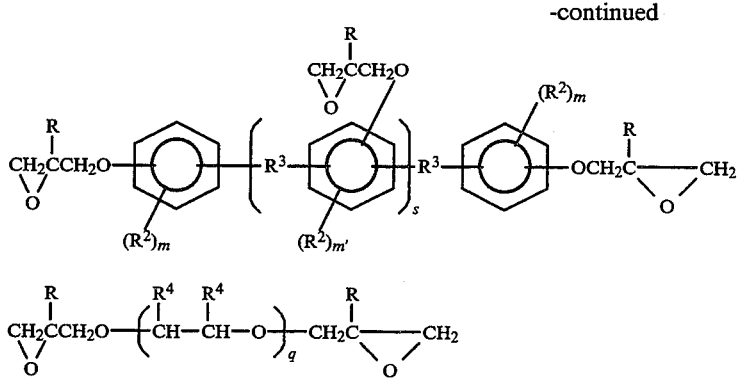

13

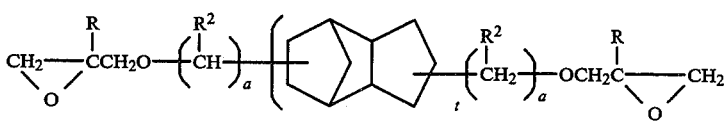

14

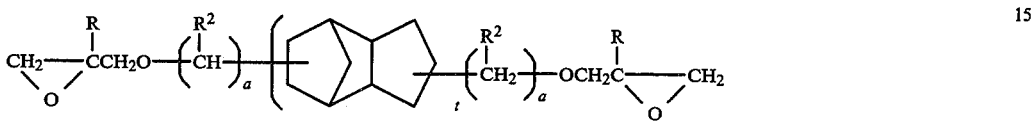

15 wherein R, R$^1$, R$^2$, R$^3$, R$^4$, a, m, m' q and t are as defined previously;

r is a positive real number of about 0 to about 40; and s is a positive real number of about 0 to about 10.

Preferably, r is a positive real number of about 0 to about 10, and most preferably from about 1 to about 5. Preferably, s is a positive real number of from about 0 to about 8; and most preferably from about 0 to about 4. The symbols, p, q, r and s, represent an average number, as the compounds to which they refer are generally found as a mixture of compounds with a distribution of the units to which p, q, r and s refer.

If a polyepoxide corresponding to formula 13 is used in the preparation of Reaction Product A, s should be chosen such that the reaction product is not crosslinked to a stage that gel formation occurs. Preferably, s is from about 0 to about 0.25. In Reaction Product A the polyepoxide used preferably corresponds to formulas 11, 12 or 14. In another preferred embodiment the polyepoxide used in Reaction Product A is from about 85 to about 100 percent by weight of polyepoxides corresponding to formulas 11 and 12 and about 0 to about 15 percent by weight of polyepoxides corresponding to formula 14. In a more preferred embodiment from about 85 to about 100 percent of the polyepoxide used in Reaction Product A corresponds to formula 11 and from about 0 to about 15 percent corresponds to formula 14. In an even more preferred embodiment the polyepoxide used in Reaction Product A corresponds to formula 11.

The chain terminator useful in this invention can be any known epoxy resin chain terminator to one skilled in the art. In general, a chain terminator is a monofunctional compound containing an active hydrogen containing moiety which reacts with an epoxy moiety. The chain terminator functions to reduce the molecular weight of the final epoxy resin. Preferably the chain terminator corresponds to the formula

B-D-H wherein B is a C$_{6-20}$ hydrocarbyl moiety; and D is O, NH, COO, or S. B is preferably an C$_{7-20}$ alkyl substituted aryl moiety, or a C$_{12-18}$ saturated or unsaturated hydrocarbon chain. B is even more preferably an alkyl substituted phenyl moiety or a C$_{12-18}$ saturated or unsaturated hydrocarbon chain. Among preferred chain terminators are para(tertiarybutyl)phenol and linseed oil fatty acid.

Reacted into the backbone of the epoxy resin composition, Reaction Product A, is a nominally difunctional fatty acid or dimer of an unsaturated fatty acid. Nominally difunctional as used herein refers to a mixture of compounds, in which a majority of the mixture contains difunctionality, and wherein the mixture contains some monofunctional compounds and some higher functional compounds. Difunctional means that the compound has two acid groups. Useful herein are C$_{12-36}$ fatty acids containing on average about 2 carboxylic acid groups, or dimers of unsaturated fatty acids. Dimers of unsaturated fatty acids are the reaction product of unsaturated fatty acids wherein the reaction takes place through the double bonds of the unsaturated hydrocarbon chain in the carboxylic acids, this is usually performed through free radical induced addition. Preferably such nominally difunctional fatty acids or dimers of fatty acids correspond to formula 17

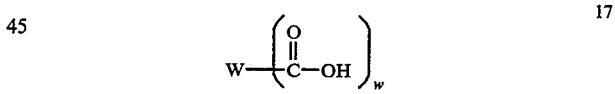

17 wherein

W is a straight or branched saturated or unsaturated C$_{12-36}$ hydrocarbon chain;

and w is a positive real number of greater than about 1. Preferably, w is from about 1.8 to about 2.25.

Examples of straight chain alkenyl acids from which dimeric fatty acids useful in this invention may be prepared include 2-hexenoic (isohydroascorbic), 3-hexenoic (hydrosorbic), trans-2-heptenoic, 2-octenoic, 2-nonenoic, 4-decenoic (obtusilic), 9-decenoic (caproleic), 10-undecenoic (undecylenic), 3-dodeconoic (linderic), tridecenoic, 9-tetradecenoic (myristoleic), pentadecenoic, cis-9-hexadecenoic, (cis-9-palmitoleic), trans-9-hexadecenoic (trans-9-palmitoleic), 9-heptadecenoic, cis-6-octadecenoic (petroselinic), trans-6-octadecenoic (petroselaidic), cis-9-octoadecenoic (oleic), trans-9-octadecenoic (elaidic), cis-11-octadecenoic, and trans-11-octadecenoic (vaccenic).

Optionally reacted into the backbone of Reaction Product A is a poly(aromatichydroxy) hydrocarbon. A poly(aromatichydroxy) hydrocarbon means herein a polyhydroxy hydrocarbon which contains more than one hydroxy moiety bound to one or more aromatic rings. In some embodiments the poly(aromatichydroxy) hydrocarbon is a mixture of compounds with different numbers of aromatic hydroxy groups, wherein the average is greater than one. Preferred poly (aromatic hydroxy) containing compounds correspond to formula 2. Preferably the aryl moieties in formula 2 are phenyl moieties (i.e. polyphenolic compounds). In a more preferred embodiment poly (aromatic hydroxy) containing compounds correspond to formulas 3 and 5 hereinbefore. The diphenolic compounds are even more preferred, with dihydroxy phenols most preferred. The average functionality, i.e. number of hydroxy moieties, of the poly(aromatic hydroxy) containing compounds are chosen such that Reaction Product A does not form a gel. Preferably the average functionality (i.e. u in Formula 2) is about 2.25 or less preferably above about 1.0 to about 2.25, more preferably about 1.9 to about 2.1. With respect to formula 5, p is preferably from about 0 to about 0.25.

In Reaction Product A the amounts of the various components are chosen such that Reaction Product A has terminal glycidyl ether moieties and the desired properties. The polyaromatic hydroxy containing compounds function to advance the polyepoxide and to increase the epoxy equivalent weight of Reaction Product A. The polyaromatic hydroxy containing compounds, if present, are present in a sufficient amount to achieve the targeted epoxy equivalent weight of Reaction Product A. The chain terminators function to reduce the epoxy equivalent weight of Reaction Product A and to prevent crosslinking, thus reducing the viscosity of Reaction Product A. The chain terminator, if present, is present in sufficient amount to achieve the targeted molecular weight and viscosity of Reaction Product A. The nominally difunctional $C_{12-36}$ fatty acids or dimers of unsaturated fatty acids enhance the coating properties of coatings prepared from Reaction Product A, in particular the chemical resistance, flexibility and adhesion can be improved. The nominally difunctional $C_{12-36}$ fatty acids or dimers of unsaturated fatty acids are present in sufficient amount to improve the coating properties of coatings prepared from Reaction Product A.

Preferably Reaction Product A is the reaction product of from about 40 to about 95 parts by weight of one or more polyepoxides, from about 0 to about 15 parts by weight of one or more poly (aromatic hydroxy) hydrocarbons, from about 0 to about 10 parts by weight of a chain terminator, and from about 5 to about 25 parts by weight of one or more nominally difunctional $C_{12-36}$ fatty acids or a dimers thereof wherein the sum of the parts of components in Reaction Product A is 100. In a more preferred embodiment, the Reaction Product A, comprises from about 60 to about 80 parts by weight of one or more polyepoxides, from about 0 to about 10 parts by weight of one or more poly (aromatic hydroxy) hydrocarbons from about 0 to about 5 parts by weight of one or more epoxy chain terminators and from about 5 to about 15 parts by weight of one or more nominally difunctional $C_{12-36}$ fatty acids or dimers thereof. Preferably Reaction Product A has an epoxy equivalent weight (EEW) of from about 200 to about 1000, more preferably from about 300 to about 500.

Procedures for performing such a reaction are well-known in the art. See "the Handbook of Epoxy Resins" by H. Lee and K. Neville (1967), McGraw Hill, New York and U.S. Pat. Nos. 2,633,458; 3,477,990; 3,821,243; 3,907,719; 3,975,397; and 4,071,477 (all incorporated herein). Preferably the components are contacted in the presence of a catalyst and reacted until the desired epoxy equivalent weight is achieved. Catalysts which may be employed to facilitate the preparation of Reaction Product A are those known to those skilled in the art for the reaction of epoxy moieties with active hydrogen containing compounds. Examples of useful catalysts include zinc carboxylate, organozinc chelate compound, trialkyl aluminum, quaternary phosphonium and ammonium salts, tertiary amines and imidazole compounds. The preferred catalysts are imidazole compounds. Particularly, preferred catalysts are 2-phenyl imidazole 2-methyl imidazole, 1-methyl imidazole, 2-ethyl-4-methyl imidazole and 4,4'-methylene-bis(2-ethyl-4-methyl imidazole). The catalyst is generally employed in an amount of from about 0.01 to about 2; preferably about 0.02 to about 1, most preferably about 0.02 to about 0.1, weight percent based on the combined weight of the polyepoxide compound, the one or more nominally difunctional $C_{12-36}$ fatty acids or dimers thereof, chain terminator and polyhydroxy hydrocarbon used.

The polyepoxide, the one or more nominally difunctional $C_{12-36}$ fatty acids or dimers thereof, optional chain terminator and optional polyhydroxy hydrocarbon may be reacted in the present of a solvent or neat, that is in the absence of a solvent. Solvents which may be used are those which are typically used as solvents for epoxy advancement reactions. Included among preferred solvents are aromatic hydrocarbons, mixtures of aromatic hydrocarbons and alkanols, glycols, glycolethers, ketones and the like. Preferred are the glycols and glycol ethers. A reaction in solvent may be advantageous wherein heat control is desired, as the presence of a solvent allows better heat control of the reaction.

The reaction is preferably performed at a temperature of about 80° C. or above, as below about 80° C. the reaction time is too slow. Preferably the reaction is performed at a temperature of about 230° C. or less, the polymer reacts too fast above such temperature and unwanted colors may be formed due to the presence of oxidated by-products. More preferably the upper limit on reaction temperature is about 200° C. or below. More preferably the lower limit on reaction temperature is about 150° C. or above. The temperature which may be used for the reaction depends on whether or not a solvent is used, and its nature. Generally the reaction mixture is heated until an exotherm results, and then the temperature is controlled so as to maintain the preferred temperatures as described herein.

The polyepoxide advancement reaction is allowed to proceed for a time sufficient to result in a reaction product of the one or more nominally difunctional $C_{12-36}$ fatty acids or dimers thereof, chain terminator if present and polyhydroxy hydrocarbon if present with the advanced polyepoxide which has the desired epoxy equivalent weight. Preferably, the reaction time is about 30 minutes or greater, more preferably about 2 hours or greater. Preferably the maximum reaction time is about 10 hours or less, more preferably about 4 hours or less.

The reaction may be performed via batch process, or via a continuous addition process. In a batch addition process all of the reactants are charged to a reactor and reacted under the conditions described hereinbefore. Under a continuous addition process, the amine is continuously added to an excess of the polyepoxide, for example, in a plug flow type reactor, and the materials reacted as hereinbefore described.

In a preferred embodiment, Reaction Product A corresponds to formula 18

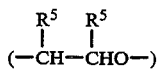

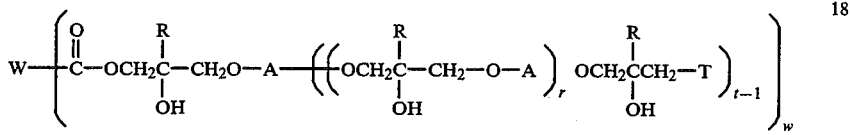

wherein T corresponds to one of the formulas

—B—D or

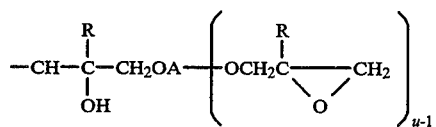

and W, R, A, r, t and w, are as hereinbefore defined.

In an even more preferred embodiment the Reaction Product A corresponds to formula 19

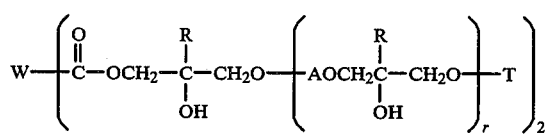

R, A, T and r are as defined hereinbefore.

In order to form a composition which is capable of forming a stable emulsion, a surfactant is added in sufficient amount to provide a composition capable of forming a stable emulsion. The surfactant comprises an alkyl aryloxy poly(propyleneoxy) poly(ethyleneoxy) ethanol or $C_{12-36}$ hydrocarbyloxy poly(propyleneoxy) poly(ethyleneoxy) ethanol wherein the hydrocarbyloxy moiety is a residue of a $C_{12-36}$ fatty alcohol or hydrocarbylcarbonyloxy poly(propyleneoxy) polyethylenoxy wherein the hydrocarbylcarboxyloxy moiety is the residue of a $C_{12-36}$ fatty acid. Preferably, the surfactant corresponds to the formula 20

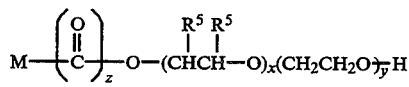

wherein

M is an alkyl substituted aryl moiety, or a straight or branched saturated or unsaturated $C_{12-36}$ hydrocarbon chain;

$R^5$ is hydrogen, methyl or ethyl;

x is a positive real number of from about 20 to about 95;

y is a positive real number from about 15 to about 100; and z is 0 or 1 with the proviso that M, x and y are selected such that the surfactant has an H-L-B of from about 9 to about 16, and a further proviso that for each unit of

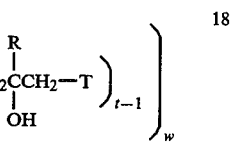

if one $R^5$ is ethyl, the other must be hydrogen.

M is preferably an alkyl substituted aryl moiety, more preferably a $C_{6-20}$ alkyl substituted phenyl group, even more preferably a $C_{6-12}$ alkyl substituted phenyl group, and most preferably nonyl substituted phenyl. Z is preferably 0.

The surfactant more preferably corresponds to formula 21

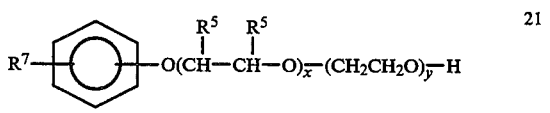

wherein $R^5$ x and y are as previously defined, and, $R^7$ is independently in each occurrence $C_{6-20}$ alkyl or alkenyl. $R^7$ is preferably $C_{6-12}$ alkyl, and most preferably nonyl.

The surfactants used in this invention often contain residual polyglycols which are block copolymers of ethylene oxide and propylene oxide. Such compounds are present because they are by-products of the processes used to prepare the surfactants described before, which have not been removed.

Preferably the surfactant is present in from about 1 to about 6 parts per weight per 100 parts of Reaction Product A. More preferably the surfactant is present in from about 3 to about 4 parts per 100 parts Reaction Product A. The surfactant preferably has an H-L-B value from about 9 to about 12.

Optionally, the emulsifiable composition comprising Reaction Product A and the surfactant may further comprise an organic solvent present in sufficient amounts to stabilize the epoxy emulsion in water. Preferably such solvent is present in amounts of up to about 20 weight parts, more preferably from about 1 to about 10 weight parts and most preferably from about 1 to about 5 weight parts of solvent per 100 weight parts of Reaction Product A. In another embodiment such solvent is preferably present in amounts of up to about 20 weight parts, more preferably from about 1 to about 10 weight parts and most preferably from about 1 to about 5 parts by weight of solvent per 100 weight parts of Reaction Product and surfactant combined. Preferred solvents include glycols based on alkylene glycols, and ethers thereof, alkyl or hydroxyalkyl substituted benzenes, lower alkanols, Y-butyrolactone, Y-caprolactone and n-methyl pyrrolidone. The preferred alkylene glycols are those based on ethylene, propylene, and butylene oxide. The glycol ethers are alkyl ethers of such glycols. Preferred glycols are those based on propylene oxide and butylene oxide, with preferred glycol ethers being lower alkyl ethers of propylene and butylene glycols. The most preferred glycol ethers are the lower alkyl ethers of propylene glycol. Examples of the preferred solvents are methyl ether of propylene glycol, benzyl alcohol, isopropyl alcohol, butyrolactone, γ-caprolactone, n-methyl pyrrolidone, and xylene. Thus, the emulsifiable composition may comprise Reaction Product (A), the surfactant (B), and (C) an organic cosolvent as described herein.

In another embodiment this invention provides an emulsifiable composition comprising (1) from about 50 to about 70 weight percent of a composition comprising the reaction product of (a) from about 40 to about 90 parts by weight of diglycidylether of dihydric phenol, (b) from about 5 to about 35 parts by weight of dihydric phenol, (c) from about 5 to about 25 parts by weight of dimer fatty acid, (d) from about 1 to about 10 parts by weight of p-tert. butylphenol and/or monomeric fatty acid, wherein the molecular weight of the epoxy resin is in the range of from about 500 to about 2000 and (2) from about 1 to about 25 weight percent based on resin solids weight, of water-immiscible $C_{8-20}$ aliphatic monoepoxide reactive diluent or high boiling low viscous liquid hydrocarbon resin (e.g. Actrel 400 from Exxon Chemical, bp 330° C. to 355° C.). Such water immiscible diluents improve the coalescence by coating the particles of the epoxy resin solids and provide the aqueous emulsion with improved shear, freeze-thaw resistance, shelf viscosity stability and paint gloss. The advantage of the $C_{8-20}$ aliphatic monoepoxide is that it becomes incorporated into the film-forming coating during the subsequent room temperature curing of the aqueous emulsion formulation containing a polyamine hardener after it is coated in the substrate.

In another embodiment the emulsifiable composition may further comprise a polyfunctional polyepoxide compound which is capable of introducing additional crosslinking in the cured coatings. Such polyfunctional polyepoxide compounds preferably have an average number of epoxy moieties per molecule of more than 2.25 for examples compounds corresponding to formula 10 where u is greater than about 2.25. More preferred are compounds according to formula 13 where s is greater than about 0.25, preferably where s is from about 1 to about 4. Such compounds can be blended with the surfactant, Reaction Product A, added to a water emulsion of such materials, or to a water emulsified composition which further contains an epoxy resin curing agent. Preferably the polyfunctional polyepoxide compound is present in amounts of from about 1 to about 25 per hundred parts of reaction product A, more preferably from about 5 to about 10 parts. In this embodiment, where a polyfunctional polyepoxide is added, sufficient surfactant as previously described herein is added to disperse the entire composition. The surfactant is added in the same ratios in relation to the polyfunctional polyepoxide as described with respect to amounts added in relation to Reaction Product A.

In another embodiment of the invention, a water emulsion is formed from the emulsifiable composition of this invention. Such emulsion comprises the Reaction Product (A), the surfactant, optionally the organic cosolvent, optionally a polyfunctional polyepoxide compound and water. The solids level of such an emulsifiable composition is sufficient to allow the formation of a continuous coating on a substrate by coating the substrate with the composition in the presence of a curing agent and allowing the water and optional organic cosolvent to evaporate. If the solids level is too high, the composition is too viscous to allow even coating, whereas if the solids level is too low a continuous film will not be formed due to running and sagging. Preferably, the solids level is from about 40 to about 80 percent, with from about 50 to about 70 percent solids level being more preferred. Solids level refers herein to Reaction Product A, the surfactant and previously described optional components, in the water emulsion. It is preferred that the emulsion has a viscosity (Brookfield Model RV Spindle No 5, 20 RPM) of from about 100 to about 1000 mPa.s at 25° C., and more preferably from about 500 to about 1000 mPa.s.

The stable emulsion can be prepared by contacting Reaction Product, surfactant, optionally an organic cosolvent, optionally polyfunctional polyepoxide and water. Methods for such contacting are well-known in the art and such methods can be readily adapted by a skilled artisan to the claimed composition.

In a preferred method of formation of the emulsion a high speed stirrer is used. The water is preferably added slowly in a number of equal portions. In a preferred embodiment water is added to Reaction Product A, surfactant and optionally, organic cosolvent, with stirring at about 1000 to about 2000 rpm, until about 90 percent solids is reached. The mixture is stirred for about 10 minutes at about 1000 to about 2000 rpms. Then added sequentially are portions of water of about 5 to about 20 percent by weight based on the resin. The water should be added slowly with stirring. Preferably about 10 minutes of stirring follows each addition to facilitate emulsification. This is continued until the desired solids level is achieved. The temperature of addition may be any temperature at which a stable emulsion is formed. Preferable addition temperatures are from 25° C. to 80° C., more preferably from 25° C. to 40° C.

In another embodiment of the invention, the invention is a two-part coating composition comprising the water emulsion described hereinbefore as one part, and a water dispersion, emulsion, or solution of an epoxy resin curing agent, i.e. hardener, in sufficient amounts to cure the epoxy resin and form a continuous coating. Generally, any known curing agent for an epoxy resin which is water-soluble, dispersible or emulsifiable, may be used in the coating composition. The curing agents used in this invention can be water dispersible. In those embodiments where a non-dispersible curing agent is used sufficient emulsifier should be present in the dispersion containing such a curing agent to render the entire dispersion stable in water, including the curing agent.

Preferable curing agents which may be used in this invention are those which are soluble or dispersible in water and which contain more than about 2 active hydrogen atoms per molecule and include diamines and polyamines or adducts of such polyamines with epoxy resin, such as for example a reaction product of an excess of equivalents of isophorone diamine with a diglycidyl ether of bisphenol A wherein such reaction product preferably has an amine equivalent weight of 115; modified polyamides and amidoamines, and arylic anhydrides. Preferred are the polyamines. Also useful as curing agents are aminoalkylated interpolymers of vinyl carboxylic acids, and salts thereof, as described in U.S. Pat. No. 4,227,621 (incorporated herein by reference). Preferred curing agents include aliphatic polyamines, polyglycoldiamines, polyoxypropylene diamines, polyoxypropylenetriamines, amidoamines, imidazolines, reactive polyamides, ketimines, arylaliphatic-polyamines (i.e. xylylenediamine), cycloaliphatic amines (i.e. isophoronediamine or diaminocyclohexane) methane diamine, 3,3-dimethyl- 4,4-diamino-dicyclohexylmethane, heterocyclic amines (aminoethyl piperazine), aromatic polyamines, (methylene dianiline), diamino diphenyl sulfone, mannich base, phenalkamines, N,N',N"-tris(6-aminohexyl) melamine, and the like. Example of more preferred curing agents include modified polyamide curing agents like Casamid 360 (Anchor Chemicals (UK) Ltd.) or Epilink DP 660 which is an amine-epoxy adduct. Other useful hardeners may be of the Mannich base class which are reaction products between nonyl phenol, formaldehyde and a polyamine e.g. xylylenediamine. Such a product is sold by Akzo under the tradename Epilink DP 500. In one embodiment preferred curing agents are described in commonly assigned patent application Ser. No. 991784, filed Dec. 17, 1992.

The epoxy resin composition of this invention is contacted with sufficient curing agents to cure the resin. Preferably the ratio of (epoxy glycidyl ether) equivalents to equivalents of curing agent is from about 0.5:1 to about 2:1; more preferably from about 0.6:1.4 to about 1.4:0.6; even more preferably from about 0.8:1.2 to about 1.2:0.8 and most preferably from about 0.9:1.1 to about 1.1:0.9.

The emulsions of this invention may include pigments, dyes, stabilizers, plasticizer's and other conventional additives. Preferably the formulation dispersion or emulsion in water has a solids level of from about 10 to about 80, and most preferably from about 50 to about 70 percent.

The coatings of the invention are contacted with a substrate, and water and any cosolvents used are then evaporated off to leave a coating. The coating will cure at room temperature in several days. Elevated temperatures may be used to speed up the cure of the coating composition. Such curing conditions are well known to those skilled in the art. The coating composition may be contacted with the substrate by any means known in the art, including spraying, pouring or roller-coating the formulation.

The following examples are included for illustrative purposes and are not intended to limit the scope of claims herein. All parts and percentages stated herein are by weight, unless otherwise indicated.

EXAMPLE 1

To a 1 liter flask, equipped with a condenser, electric driven motor, stirrer and a heating mantel are charged 465.5 g of diglycidyl ether of bisphenol A (2,2 bis-4 hydroxyphenyl propane) having an epoxy equivalent weight of 176 to 185 (DER* 330 *Trademark of The Dow Chemical Company), 96.6 g polyoxypropylene glycol diglycidylether (DER* 732); 79.8 g of bisphenol A; 51.1 g of a dimerized $C_{18}$ fatty acid containing 77 percent of dibasic acids, 14 percent polybasic acids and 9 percent of monobasic acids (Pripol* 1022 *Trademark of Quantum Oleochemicals group), and 7 g of para tert-butyl phenol. The mixture is stirred for 15 minutes. Heating is started. After 35 minutes the temperature is 90° C. and 0.35 g ethyl triphenyl phosphonium acetate solution (70 percent by weight in methanol) is added. The temperature increases to 165 to 200 over 40 minutes as a result of the exotherm, and maintained for 90 minutes. The mixture is then allowed to cool. After 50 minutes the temperature is 40° C. The mixture is split into two parts. To one half is added 10.5 g of nonyl phenoxy poly(propyleneoxy) poly(ethyleneoxy) ethanol block copolymer with a molecular weight of about 2700 and a HLB of 12. To the other half is added 10.5 g of a nonylphenoxy poly(ethyleneoxy) ethanol molecular weight about 4200 (n=100). (Antarox* CA 990 *Trademark of GAF GmbH). Thereafter 35 g of a monomethyl ether of propylene glycol (Dowanol* PM *Trademark of The Dow Chemical Company) is added to the two mixtures. The epoxy equivalent weight of the epoxy resin prepared is 400.

Emulsions of the two mixtures are formed by the following procedure. To a flask equipped with a high speed propeller blade stirrer is added the mixture. With stirring at 1000 to 2000 rpm is added water in a number of equal portions, each about 10 percent by weight of the epoxy resin, allowing 5 to 10 minutes emulsification time between each addition. Water is added until the final solids content of 70 percent by weight is reached. The emulsion containing nonylphenoxy poly(propyleneoxy) (polyethyleneoxy) ethanol demonstrates a viscosity of 8000 mPa.s/25° C. at 70 percent solids content. The emulsion containing Antarox CA 990 destabilized after a few minutes and was not useful for further testing.

The good emulsion was mixed with an equivalent amount of modified reactive polyamide (Casamid* 360, Ancamide* 360 *Trademark of Anchor Chemical), e.g. one equivalent of epoxy resin with 300 g of modified reactive polyamide. The modified reactive polyamide is introduced as a 50 percent solids dispersion in water.

The emulsion was coated onto zinc-plated bonder plates (132 mm×60 mm×2 mm) using a wire coating bar. The coatings are cured at room temperature (about 23° C.) at a relative humidity of about 60 percent for 7 days. The following test procedures are used to examine the coatings.

Solvent resistance is measured by rubbing with a 2-pound (0.9 kg) ballpein hammer where the hammer head is covered with gauze and soaked in methyl ethylketone (MEK). The number of double-rubs (DR) by a push-pull motion until a marring of the coating occurs is observed and recorded.

Chemical resistance is measured by soaking a piece of cotton with the test liquid and placing the soaked cotton on the coating surface. Hardness of the coating is measured before and after exposure in intervals of 1 week. The exposed surface is also checked for visual changes e.g. blister formation, coating lift-off or colour change. The soaked cotton on the coating surface is covered with a Petri-dish and sealed with a silicon-grease to avoid evaporation of the test liquid.

The adhesion is determined as follows. The coating is deeply scribed with a razor blade in the shape of a Greek letter lambda or with a commercial set of 10 parallel blades at a distance of 1 mm for each other as specified according to DIN 53151. A piece of cellophane tape is laid over the entire scribed surface with a hard rubber eraser; the tape is removed by pulling rapidly towards the bottom of the test panel.

Reverse/direct impact is determined by the procedure of ASTM D 2794. General application of formulated dispersions on steel panels is done by 150 microns wire coating bar. For mechanical properties 1 layer (40 micrometers dry) and for chemical resistance and salt spray test (Bonder 120) 2 layers (80 micrometers dry).

The stability of the two epoxy resin emulsions in water and the properties of the coating prepared from the epoxy resin emulsion described above are compiled in Table 1.

EXAMPLE 2

To a 10 liter steel reaction, equipped with a condenser, electric driven motor, stirrer and a heating mantel are charged 8059 g of diglycidyl ether of bisphenol A (2,2 bis-4 hydroxyphenyl propane) having an epoxy equivalent weight of 180 (DER* 330 *Trademark of The Dow Chemical Company); 839.5 g of bisphenol A; 1001.80 g of a dimerized $C_{18}$ fatty acid containing 77 percent of dibasic acids, 14 percent polybasic acids and 9 percent of monobasic acids (Pripol 1022 Trademark of Quantum Oleochemicals group), and 100 g of para tert-butyl phenol. The mixture is stirred for 15 minutes. Heating is started. After 60 minutes the temperature is 90° C. and 7.14 g ethyl triphenyl phosphonium acetate solution (70 percent by weight in methanol) is added. The temperature increases to 165 to 172 over about 60 minutes as a result of the exotherm, and is maintained for about 30 minutes. The mixture is then allowed to cool. After 60 minutes the temperature is 82° C. To the mixture is added 1112.0 g of monomethyl ether of propylene glycol. To the contents of the reactor is added 300 g of nonyl phenoxy poly(propyleneoxy) poly(ethyleneoxy) ethanol block copolymer with a molecular weight of about 2700 and 1112 g of a monomethyl ether of propylene glycol. The epoxy equivalent weight of the epoxy resin prepared is 300. The epoxy equivalent weight of the total solution is 333 and the viscosity is 16000 mPa.s at 25° C.

An emulsion of the mixture is formed by the procedure disclosed in Example 1. The final solids content is 70 percent by weight. The dispersion demonstrates a viscosity of 15000 mPa.s at 25° C.

The emulsion is contacted with an equivalent amount modified reactive polyamide (Casamid 360, Ancamide 360 Trademark of Anchor Chemicals). One equivalent of epoxy resin with 300 g of modified reactive polyamide. The modified reactive polyamide is introduced as a 50 percent solids dispersion in water.

The dispersions are coated onto zinc-plated bonder plates as described in Example 1.

The stability of the epoxy resin emulsion in water and the properties of coating prepared from the epoxy resin emulsion are determined as described in Example 1. The results are compiled in Table 1.

EXAMPLE 3

To a 1 liter flask, equipped with a condenser, electric driven motor, stirrer and a heating mantel are charged 720.0 g of diglycidyl ether of bisphenol A (2,2 bis-(4 hydroxyphenyl) propane) having an epoxy equivalent weight of 176 to 185 (DER* 330 *Trademark of The Dow Chemical Company); 75.0 g of bisphenol A; 89.5 g of a dimerized $C_{18}$ fatty acid containing 77 percent of dibasic acids, 14 percent polybasic acids and 9 percent of monobasic acids (Pripol 1022 Trademark of Quantum Oleochemicals group), and 8.9 g of para tert-butyl phenol. The mixture is stirred for 15 minutes. Heating is started. After 60 minutes the temperature is 90° C. and 0.65 g ethyl triphenyl phosphonium acetate solution (70 percent by weight in methanol) is added. The temperature increases from 165° C. to 172° C. over 60 minutes as a result of the exotherm, and is maintained for 30 minutes. The mixture is then allowed to cool. After 60 minutes the temperature is 82° C. and to the mixture is added 54 g of monomethyl ether of propylene glycol. Thereafter the mixture is added 30.7 g of nonyl phenoxy poly(propyleneoxy) poly(ethyleneoxy) ethanol block copolymer with a molecular weight of about 2700 (Tensiofix DW 900 Trademark of ICI Renory S.A.) and 90 g of Actrel 400. The epoxy equivalent weight of the epoxy resin prepared is 300.

A dispersion of the mixture is formed by the procedure described in Example 1. The final solids content is 65 percent by weight. The viscosity is 3920 mPa.s/25° C. Coatings are prepared and tested as described in Example 1. The stability of the epoxy resin emulsion in water and the properties of coatings prepared from the epoxy resin emulsions are compiled in Table 1.

EXAMPLE 4

To a 10 liter reactor, equipped with a condenser, electric motor driven stirrer, a double mantle heating jacket are charged 6978.02 g of diglycidylether of bisphenol A (2,2 bis-4 hydroxy phenyl propane) having an epoxy equivalent weight of 176 to 185 (DER 330*); and 661.5 g of bisphenol A and 88,73 g of para tert-butyl phenol and 892.26 g of a dimerized $C_{18}$ fatty acid containing 77 percent of dibasic acid, 14 percent polybasic acids and 9 percent of monobasic acids (Pripol* 1022 *Trademark of Quantum Oleochemicals group). The mixture is stirred for 15 minutes. Heating is started. After 45 minutes the temperature is 90° C. and 5.67 g ethyl triphenyl phosphonium acetate solution (70% by weight in methanol) is added. The temperature is increased to 160° C. to 175° C. over 70 minutes and kept at 175° C. for 25 minutes. The mixture is then allowed to cool within 30 minutes to 100° C. To the mixture is added 1049, 77 g of a $C_{13}$–$C_{15}$ alcohol glycidyl ether (Grilonit 1814 Trademark from Ems Chemie). The temperature drops to 72° C. and 299.08 g nonyl phenoxy poly(propyleneoxy) poly(ethyleneoxy) ethanol block copolymer with a molecular weight of about 2700 is added. Thereafter 525 g of a monomethylether of propylene glycol is added to the mixture. The epoxy equivalent weight of the epoxy resin inclusive Grilonit 1814 is 300. The viscosity of the solution polymer is 10000 mPa.s at 25° C.

An emulsion is formed as described in Example 1. Water is added until the final solids content of 65 percent is reached. The viscosity of the emulsion is 1500 mPa.s/25° C.

A coating is prepared and tested as described in Example 1. The stability of the epoxy resin emulsion in water and the properties of the coating are compiled in Table I.

EXAMPLE 5

To a 1 liter flask, equipped with a condenser, electric driven motor, stirrer and a heating mantel are charged 800 g of diglycidyl ether of bisphenol A (2,2-bis-4 hydroxyphenyl propane) having an epoxy equivalent weight of 176 to 185 (DER* 330 *Trademark of The Dow Chemical Company); and 208.00 g of a dimerized $C_{18}$ fatty acid containing 77 percent of dibasic acids, 14 percent polybasic acids and 9 percent of monobasic acids (Pripol* 1022 *Trademark of Quantum Oleochemicals group). The mixture is stirred at room temperature (about 22° C.) for 20 minutes. Heating is started. After 20 minutes the temperature is 107° C. and 0.70 g ethyl triphenyl phosphonium acetate solution (70 percent by weight in methanol) is added. The temperature increases to 165 to 170° C. over 10 minutes as a result of the exotherm, and is maintained for 30 minutes. The mixture is then allowed to cool. After 13 minutes the temperature is 100° C. and to the mixture is added 31.20 g of nonyl phenoxy poly(propyleneoxy) poly(ethyleneoxy) ethanol block copolymer with a molecular weight of about 2700. The epoxy equivalent weight of the epoxy resin prepared is 278. The viscosity of the resin is 46000 mPa.s at 25° C.

A dispersion is formed by the procedure described in Example 1. Water is added until the final solids content of 56 percent by weight is reached. The dispersion viscosity is 10.800 mPa.s/25° C. Coatings are prepared and tested as described in Example 1.

The stability of the epoxy resin emulsion in water and the properties of the coating are compiled in Table 1.

EXAMPLE 6

To a 1 liter flask, equipped with a condenser, electric driven motor, stirrer and a heating mantel are charged 788 g of diglycidyl ether of bisphenol A (2,2-bis-4hydroxyphenyl propane) having an epoxy equivalent weight of 176 to 185 (DER* 330 *Trademark of The Dow Chemical Company); 42 g of bisphenol A; 154 g of a dimerized $C_{18}$ fatty acid containing 77 percent of dibasic acids, 14 percent polybasic acids and 9 percent of monobasic acids (Pripol 1022 Trademark of Quantum Oleochemicals group), and 10.30 g of para tert-butyl phenol. Heating is started. After 22 minutes the temperature is 100° C. and 0.70 g ethyl triphenyl phosphonium acetate solution (70 percent by weight in methanol) is added. The temperature increases to 170 to 172 over about 50 minutes as a result of the exotherm, and is maintained for 35 minutes. The mixture is then allowed to cool. After 22 minutes the temperature is 93° C. and to the mixture is added 30.70 g of nonyl phenoxy poly(propyleneoxy) poly(ethyleneoxy) ethanol block copolymer with a molecular weight of about 2700. Thereafter 94.0 g of a monomethyl ether of propylene glycol is added to the mixture. The epoxy equivalent weight of the epoxy resin prepared is 300 and the viscosity is 290000 mPa.s at 25° C.

A dispersion of the epoxy resin mixture is prepared as described in Example 1. The dispersion has a solids level of 56 weight percent, and a viscosity of 280 mPa.s/25° C.

A coating is prepared and tested as described in Example 1. The properties of the dispersion and coatings are compiled in Table 1.

EXAMPLE 7

To a one liter flask, equipped with a condenser stirrer, electric driven motor and a heating mantle are charged 616.47 g of diglycidyl ether of bisphenol A (bis-(4 hydroxyphenyl) propane) having an epoxy equivalent weight of 176 to 185 (DER* 330); 135.34 g of bisphenol A, 9.9 g of paratert. butyl phenol, 99.0 g of a dimerized fatty acid containing 77 percent of dibasic acids, 14 percent polybasic acids and 9 percent of monobasic acids (Pripol* 1022 *Trademark of Quantum Oleochemicals group). The mixture is stirred for 15 minutes. Heating is started. After 30 minutes the temperature is 92° C. and 0.6 g ethyl triphenylphosphonium acetate solution (70 % by weight in methanol) is added. The temperature is raised to 105° C. Exotherm starts peaking out at 205° C. after 25 minutes. The mixture is allowed to react at minimum temperature of 165° C. for at least one hour. Then the temperature is allowed to go down to 120° C. within 20 minutes. Then 99.0 g of a $C_{13}$-$C_{15}$ alcohol glycidyl ether (Grinolit* 1814 *Ems Chemie Trademark) is added. Under thorough stirring 29.7 g of nonyl phenoxy poly(propyleneoxy) poly(ethyleneoxy) ethanol is added. After 20 minutes stirring at 80° C., 55 g gamma-butyrolactone and 55 g of a monomethylether of propyleneglycol is added to the mixture. The epoxy equivalent weight of the epoxy resin inclusive the $C_{13}$-$C_{15}$ alcohol glycidyl ether is 450. The epoxy equivalent weight of the total mixture was determined to be 507. The viscosity of the epoxy resin solution was 65000 mPa.s at 25° C.

An emulsion of the epoxy resin mixture is prepared as described in Example 1. The emulsion has a solids level of 65 weight percent, and a viscosity of 1720 mPa.s at 25° C.

The same coating procedure as described in Example 1 was used. The films have a dry thickness of about 65 micro meters and are glossy and tough. The films are earlier tackfree than epoxy resins at lower epoxy equivalent weight. The properties of the films are measured as described in Example 1 and compiled in Table 1.

EXAMPLE 8

An emulsion is prepared from a resin mixture prepared as described in Example 7. The emulsion prepared as described in Example 1 has a 60 percent solids level, a viscosity at 100 mPa.s/23° C., and a pH of 8.

Into 100 parts of the dispersion is mixed 12.2 parts of an adduct of a diglycidyl ether of bisphenol A having an EEW of 178 to 186 and 4,4-bis(paraaminocyclo hexyl) methane dissolved in benzyl alcohol, having an amine equivalent weight of 115 (Ancamine* 2143 *Trademark of Anchor Chemical).

Coatings are prepared as described in Example 1. The films have a dry thickness of about 65 micrometers and are glossy and tough. The films are tackfree after 6 hours at 23° C. and 60 percent relative humidity. The properties of the films are measured as described in Example 1 and compiled in Table 1.

EXAMPLE 9

In a 500 ml flask equipped with a heating mantle, electromotor driven stirrer, reflux condenser, thermocouple connected with temperature control device and nitrogen sparging are placed: 103.56 parts epoxy resin polyoxypropylene diglycidyl ether of Bisphenol A (EEW 176-188), 41.43 diglycidyl ether of Bisphenol A, 27.6 parts of a blend of (EEW 180-188) of 75 parts, a diglycidyl ether of Bisphenol A (EEW 176-185) and 25 parts a-cresy/glycidyl ether, and 4.32 parts of a block copolymer comprising polyphenol initiated poly(ethyleneoxide) poly(propyleneoxide) having a molecular weight of about 2700. This block copolymer is an emulsifier. The content is allowed to stir at 40° C. for 15 minutes. Then 99 parts of water are added incrementally over 20 minutes. A fluid dispersion is formed at a stirrer speed of ca. 400 rpm. To the dispersion are added 13.38 parts ethanol amine within 15 minutes at 50° C. to 78° C. The rate of ethanol amine addition depends on the exotherm. After the ethanol amine addition is completed the dispersion is allowed to stir at 400 rpm at 80° C. for 60 minutes. The epoxy equivalent weight of the epoxy resin is about 700 and the product has a fine particle size which dissolves completely with ca. 2-3 percent acetic acid (based on solid epoxy resin).

To the colloidal emulsion 114 g of polyoxy propylene diamine (molecular weight ca 230) are added at 77° C. Exotherm starts at 77° C. and peaks at 88° C. The dispersion is allowed to stir at 95° C. for 2½ hours before its cooling and bottling. The emulsion demonstrates a solids content of 75 percent and a viscosity of ca. 1100 mPa.s at 25° C. The calculated amine hydrogen equivalent weight is ca. AHEW 184.

The following varnish formulated with the resin of this Example. A semisolid epoxy resin composition comprising 85 % of the reaction product of 65.75 parts of a diglycidyl ether of Bisphenol A having an EEW of 176–185, 11.15 parts of Bisphenol A, 0.86 parts of t-butyl phenol, 7.70 parts of a dimerized $C_{18}$ fatty acid (containing 77 percent dibasic acid, 14 percent polyfasic acid and 9 percent monobasic acids) which is blended with 2.99 parts of a nonylphenoxy poly(propyleneoxy) (polyethyleneoxy) ethanol block copolymer having a molecular weight of about 2700, having a semisolid epoxy resin at EEW 360 and 15 parts of the methyl ether of propylene glycol is emulsified in water at a total solids content of 65 percent. The EEW of this emulsion is ca. 554.55.4 parts of the epoxy emulsion are mixed with 24.5 parts of the resin of this Example. A homogeneous emulsion is formed after thorough mixing.

A clear film is prepared from the composition. The clear film is extremely adherent to glass and metal and very flexible after it cures at 23° C. for 7 days. The film is resistant to water, diluted hydrochloric acid (10 percent) and diluted caustic soda. The cured film also withstands more than 100 MEK (methylethylketone double rubs).

$C_{12-36}$ hydrocarbyloxy poly(propyleneoxy) poly(ethyleneoxy) ethanol or a hydrocarbylcarbonyloxy poly(prolyleneoxy) poly(ethyleneoxy) ethanol.

2. A composition according to claim 1 which comprises

A) the reaction product of
  i) from about 60 to about 80 parts by weight of one or more polyepoxides;
  ii) from about 0 to about 15 parts by weight of one or more poly (aromatic hydroxy) containing compounds;
  iii) from about 0 to about 10 parts by weight of one or more epoxy chain terminators;
  iv) from about 5 to about 25 parts by weight of one or more nominally difunctional $C_{12-36}$ fatty acids, or dimer of an unsaturated fatty acid;
wherein the sum total parts by weight of components i), ii), iii) and iv) is 100; and B) from 1 to 6 parts by weight per 100 parts by weight of Reaction Product A of a surfactant which comprises an alkyl aryloxy poly(propyleneoxy) poly(ethyleneoxy) ethanol, a $C_{12-36}$ hydrocarbyloxy poly(propyleneoxy) poly(ethyleneoxy) ethanol or a $C_{12-36}$ hydrocarbylcarbonyloxy poly(propyleneoxy) poly(ethyleneoxy) ethanol.

3. A water dispersible composition according to

| Example | Properties of Emulsions and Coatings | | | | | | | | |
|---|---|---|---|---|---|---|---|---|---|
| | 1 | 1* | 2 | 3 | 4 | 5 | 6 | 7 | 8 |
| EEW Solid resin | 400 | 400 | 300 | 300 | 300 | 278.1 | 300 | 450 | 450 |
| Emulsion % Solids | 70 | 50 | 65 | 65 | 65 | 56 | 56 | 65 | 65 |
| Emulsion Viscosity mPa/25° C. | 8000 | | 5200 | 3920 | 1500 | 10800 | 280 | 1720 | 1720 |
| Dispersion Stability | excellent | not stable | excellent | excellent | excellent | fair | excellent | excellent | excellent |
| MEK resistance after 7 days cure 23° C. | 65 | N/A | 100 | >100 | >100 | >100 | 100 | 100 | 100 |
| Hardness Loss 3 weeks water exposure | 25% | N/A | none | none | none | none | none | none | none |
| Film dry time hrs | 15 | N/A | 5.8 | 11 | 10.4 | 12 | 5 | 3 | 6 |
| Ericksen Flexibility | 9.8 | N/A | 9.4 | 9.8 | 9.8 | 10 | 10 | 100 | |
| Front/reverse Impact (lbx inch) | 160 | N/A | 32/4 | 140/100 | 160/40 | 160/160 | 160/160 | 140/116 | 130/104 |
| Pendulum Hardness | 245 | N/A | 270 | 240 | 270 | 200 | 200 | 213 | 130 |
| Adhesion % remain | 100 | N/A | 100 | 80 | 100 | 100 | 100 | 100 | 100 |
| Viscosity of resin mPa · s/25° C. | 14000 | 14000 | 16000 | 10000 | 10000 | 46000 | 29000 | 65000 | 65000 |
| Solids Content in weight percent | 90 | 90 | 90 | 95 | 95 | 100 | 95 | 90 | 90 |

*Comparative example

What is claimed:

1. A water emulsifiable epoxy resin composition comprising:

A) the reaction product of
  i) from about 40 to about 95 parts by weight of one or more polyepoxides;
  ii) from about 0 to about 15 parts by weight of one or more polyaromatic hydroxy containing compounds;
  iii) from about 0 to about 10 parts by weight of one or more chain terminators which comprises a monofunctional compound containing an active hydrogen containing moiety reactive with an epoxy moiety;
  iv) from about 5 to about 25 parts by weight of one or more nominally difunctional $C_{12-36}$ fatty acids or dimers of unsaturated fatty acids; wherein the total amount of parts i), ii), iii) and iv) is 100 and the reaction product has terminal epoxy moieties;

B) a sufficient amount of a surfactant to form a stable emulsion of the reaction product (A) in water wherein the surfactant comprises an alkyl aryloxy poly(propyleneoxy) poly(ethyleneoxy) ethanol, a claim 2 which further comprises up to about 20 parts per 100 parts by weight of Reaction Product A of an organic solvent comprising an alkyl ether of propylene glycol, an alkyl ether of a polypropylene glycol, an alkyl or hydroxyalkyl substituted benzene, a lower alkanol, n-methyl pyrrolidone, or Y-caprolactone.

4. A water dispersible composition according to claim 3 wherein the polyepoxide corresponds to the formula

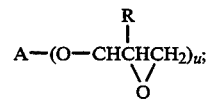

the poly (aromatic hydroxy) containing compound corresponds to the formula

the chain terminator corresponds to the formula

the nominally difunctional fatty acid corresponds to the formula

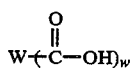

and the surfactant corresponds to the formula

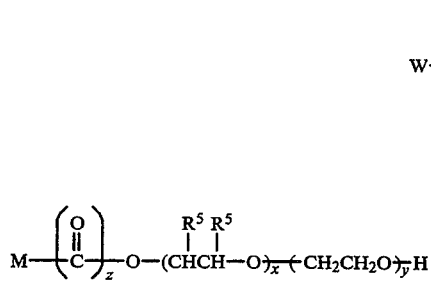

wherein
- A is independently at each occurrence an aryl moiety; an aryl moiety substituted with an alkyl or halo moiety; a polyaryl moiety wherein the aryl moieties are connected by direct bonds, alkylene, haloalkylene, cycloalkylene, carbonyl, sulfonyl, sulfinyl, oxygen or sulfur, wherein the aryl moieties are further unsubstituted or substituted with one or more halo or lower alkyl moieties; or the oligomeric reaction product of an aldehyde and phenol;
- B is a $C_{6-20}$ hydrocarbyl moiety;
- D is O, NH, —COO, or S;
- W is a straight or branched, saturated or unsaturated $C_{12-36}$ hydrocarbon chain;
- M is an alkyl substituted aryl moiety, or a straight or branched, saturated or unsaturated $C_{12-36}$ hydrocarbon chain;
- R is hydrogen or methyl;
- $R^5$ is independently at each occurrence hydrogen, methyl or ethyl;
- u is from about 1 to about 2.25;
- w is greater than about 1;
- x is from about 20 to about 95;
- y is from about 15 to about 100;
- and z is 0 or 1;

with the proviso that M, x and y are selected such that the surfactant has an HLB of from about 9 to about 16; and the further proviso that for each unit of

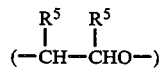

if one $R^5$ is ethyl the other must be hydrogen.

5. A composition according to claim 4 wherein z is 0.

6. A composition according to claim 5 wherein the reaction product (A) corresponds to the formula

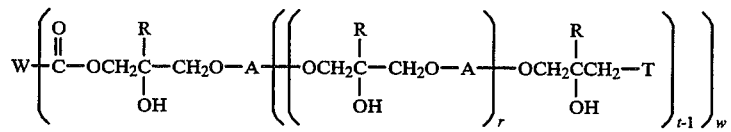

wherein
- A is independently at each occurrence an aryl moiety; a aryl moiety substituted with an alkyl or halo moiety; a polyaryl moiety wherein the aryl moieties are connected by direct bonds, alkylene, haloalkylene, cycloalkylene, carbonyl, sulfonyl, sulfinyl, oxygen or sulfur, wherein the aryl moieties are further unsubstituted or substituted with one or more halo or lower alkyl moieties; or the oligomeric reaction product of an aldehyde and phenol;
- R is hydrogen or methyl;
- T is independently at each occurrence a group of the formula;

$$-B-D \text{ or}$$

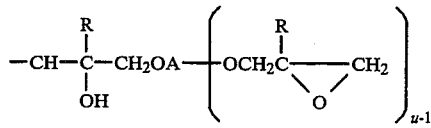

- B is a $C_{6-20}$ hydrocarbyl moiety;
- D is O, NH, —COO, or S;
- W is a straight or branched, saturated or unsaturated $C_{12-36}$ hydrocarbon chain;
- t is from about 1 to about 6;
- w is greater than about 1;
- and r is from 0 to 40.

7. A composition according to claim 5 wherein the polyepoxide corresponds to one of the formulas

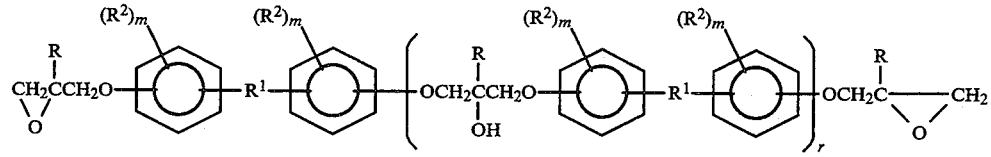

or

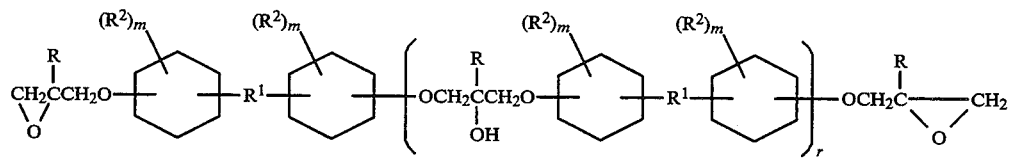

the hydroxy compound corresponds to one of the formulas

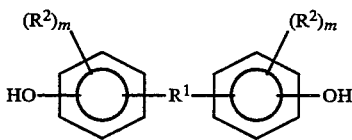

the surfactant corresponds to the formula

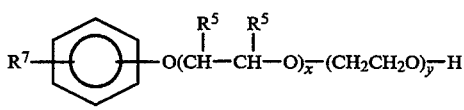

wherein

R is hydrogen or methyl;

$R^1$ is separately in each occurrence $C_{1-10}$ alkylene, $C_{1-10}$ haloalkylene, $C_{4-10}$ cycloalkylene, carbonyl, sulfonyl, sulfinyl, oxygen, sulfur, a direct bond or a moiety corresponding to the formula

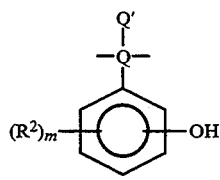

$R^2$ is independently at each occurrence $C_{1-3}$ alkyl of a halogen;

$R^7$ is independently an each occurrence $C_{6-20}$ alkylene or alkenylene;

Q is separately in each occurrence a $C_{1-10}$ hydrocarbyl moiety;

Q' is separately in each occurrence hydrogen, cyano, or a $C_{1-14}$ alkyl group;

m is independently in each occurrence an integer of about 0 to about 4;

x is from about 20 to about 95; and y is from about 15 to about 100.

8. A water emulsified epoxy resin composition comprising from 40 to 80 percent by weight of a composition according to claim 1 and 20 to 60 percent by weight of water.

9. A composition according to claim 8 which comprises

A) the reaction product of i) from about 60 to about 80 parts by weight of one or more polyepoxides;

ii) from about 0 to about 15 parts by weight by weight of one or more poly (aromatic hydroxy) containing compounds;

iii) from about 0 to about 10 parts by weight of one or more epoxy chain terminators;

iv) from about 5 to about 25 parts by weight of one or more nominally difunctional $C_{12-36}$ fatty acids, or dimer of an unsaturated fatty acid;

wherein the sum total parts by weight of components i), ii), iii) and iv) is 100; and B) from 1 to 6 parts by weight per 100 parts by weight of Reaction Product A of a surfactant which comprises an alkyl aryloxy poly(propyleneoxy) poly(ethyleneoxy) ethanol or a $C_{12-36}$ hydrocarbyloxy poly(propyleneoxy) poly(ethyleneoxy) ethanol wherein the hydrocarbyloxy moiety is the residue of a fatty alcohol.

10. A water dispersible composition according to claim 9 which further comprises up to about 20 parts per 100 parts by weight of Reaction Product A of an organic solvent comprising an alkyl ether of propylene glycol, an alkyl ether of a polypropylene glycol, an alkyl or hydroxyalkyl substituted benzene, a lower alkanol, n-methyl pyrolidone, or Y-caprolactone.

11. A water dispersible composition according to claim 10 wherein the polyepoxide corresponds to the formula

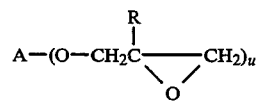

the poly (aromatic hydroxy) containing compound corresponds to the formula $A-(OH)_u$ the chain terminator corresponds to the formula

B-D-H the nominally difunctional fatty acid corresponds to the formula

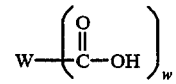

and the surfactant corresponds to the formula

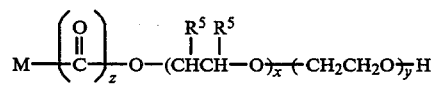

wherein

A is independently at each occurrence an aryl moiety; a aryl moiety substituted with an alkyl or halo moiety; a polyaryl moiety wherein the aryl moieties are connected by direct bonds, alkylene, haloalkylene, cycloalkylene, carbonyl, sulfonyl, sulfinyl, oxygen or sulfur, wherein the aryl moieties are further unsubstituted or substituted with one or more halo or lower alkyl moieties; or the oligomeric reaction product of an aldehyde and phenol;

B is a $C_{7-20}$ hydrocarbyl moiety;

D is O, NH, —COO, or S;

W is a straight or branched, saturated or unsaturated $C_{12-36}$ hydrocarbon chain;

M is an alkyl substituted aryl moiety, or a straight or branched, saturated or unsaturated $C_{12-36}$ hydrocarbon chain;

R is hydrogen or methyl;

$R^5$ is independently at each occurrence hydrogen, methyl or ethyl;

u is from about 1 to about 2.25;

w is greater than about 1;

x is from about 20 to about 95;

y is from about 15 to about 100;

and z is 0 or 1;

with the proviso that M, x and y are selected such that the surfactant has an HLB of from about 9 to about 16; and the further proviso that for each unit of t is from about 1 to about 6;
w is greater than about 1;
and r is from 0 to 40.

13. A composition according to claim 11 wherein the polyepoxide corresponds to one of the formulas

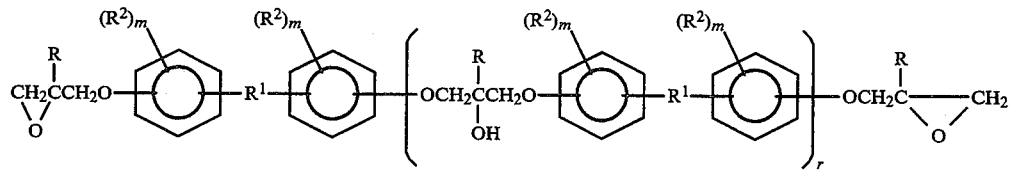

or

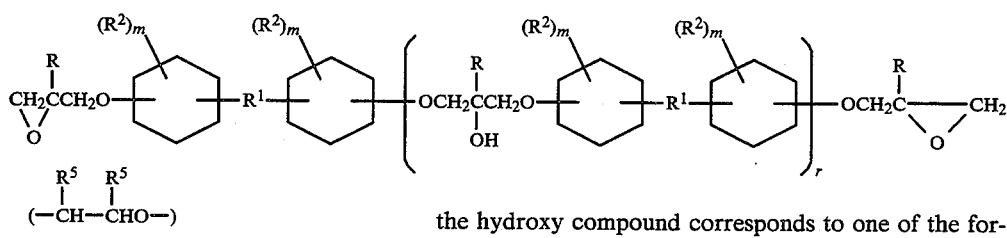

(—CH—CHO—)
R⁵ R⁵ if one $R^5$ is ethyl the other must be hydrogen.

12. A composition according to claim 11 wherein the reaction product (A) corresponds to the formula

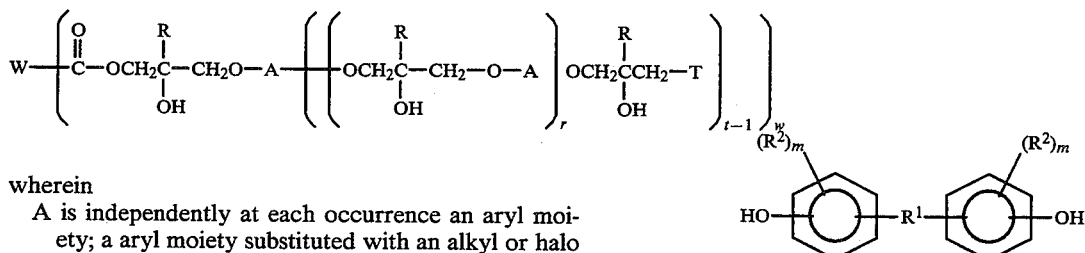

wherein
A is independently at each occurrence an aryl moiety; a aryl moiety substituted with an alkyl or halo moiety; a polyaryl moiety wherein the aryl moieties are connected by direct bonds, alkylene, haloalkylene, cycloalkylene, carbonyl, sulfonyl, sulfinyl, oxygen or sulfur, wherein the aryl moieties are further unsubstituted or substituted with one or more halo or lower alkyl moieties; or the oligomeric reaction product of an aldehyde and phenol;
R is hydrogen or methyl;
T is independently at each occurrence a group of the formula

-B-D or

—B—D or

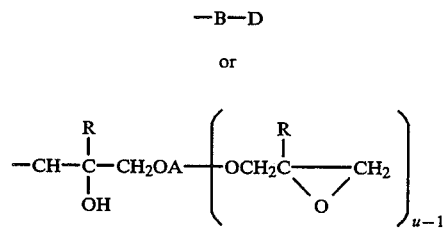

B is a $C_{6-20}$ hydrocarbyl moiety;
D is O, NH, —COO, or S;
W is a straight or branched, saturated or unsaturated $C_{12-36}$ hydrocarbon chain;
u is from about 1 to about 2.25;

the hydroxy compound corresponds to one of the formulas

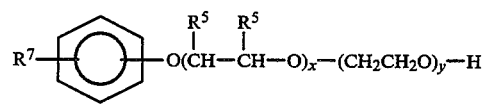

the surfactant corresponds to the formula

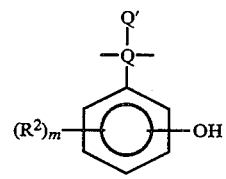

wherein $R^1$ is separately in each occurrence $C_{1-10}$ alkylene, $C_{1-10}$ haloalkylene, $C_{4-10}$ cycloalkylene, carbonyl, sulfonyl, sulfinyl, oxygen, sulfur, a direct bond or a moiety corresponding to the formula $R^2$ is independently at each occurrence $C_{1-3}$ alkyl or a halogen;
$R^7$ is independently at each occurrence $C_{6-20}$ alkylene or alkenylene;
Q is separately in each occurrence a $C_{1-10}$ hydrocarbyl moiety;
Q' is separately in each occurrence hydrogen, cyano, or a $C_{1-14}$ alkyl group;

m is independently in each occurrence an integer of about 0 to about 4.

14. A coating composition comprising a water emulsified epoxy resin of claim 8, and a curing agent for an epoxy resin in water.

15. A method of coating an article which method comprises applying to the article a coating composition according to claim 14.

16. An article at least a part of its surface of which is provided with a cured coating of a composition according to claim 14.

* * * * *